W. A. PEASE.
SOFA OR DAVENPORT BED.
APPLICATION FILED JUNE 2, 1913.
Reissued Sept. 2, 1913. 13,612.
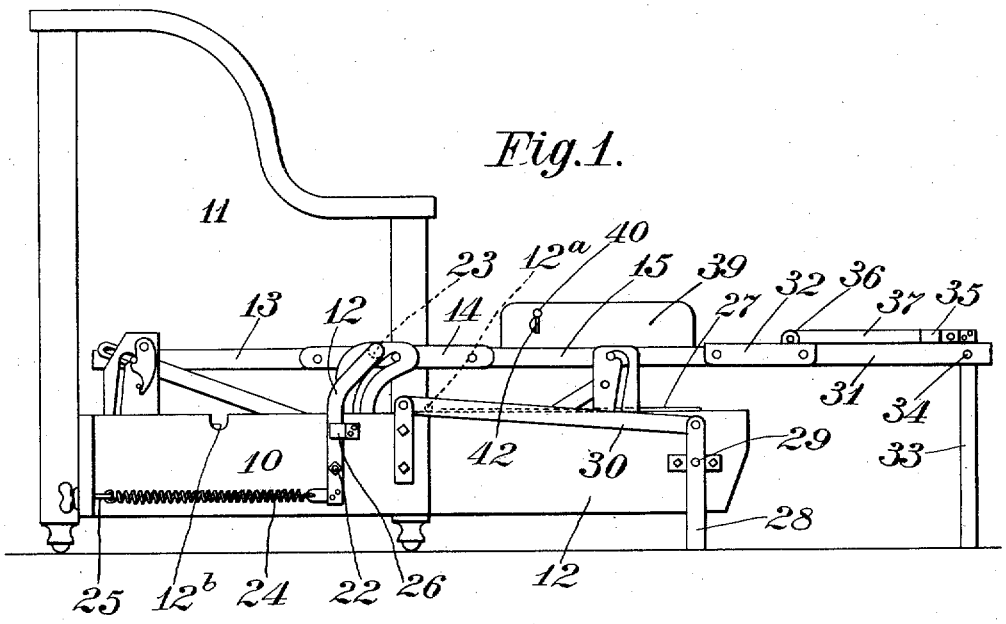
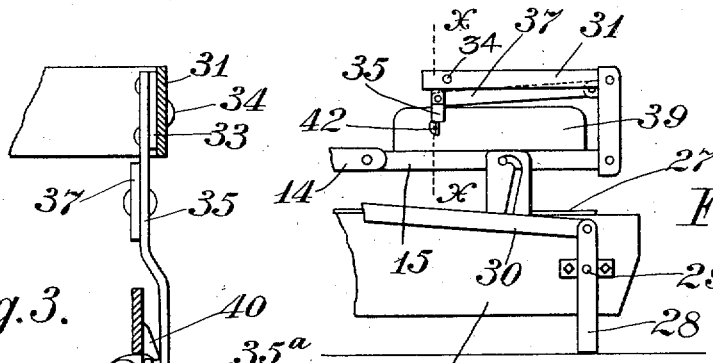
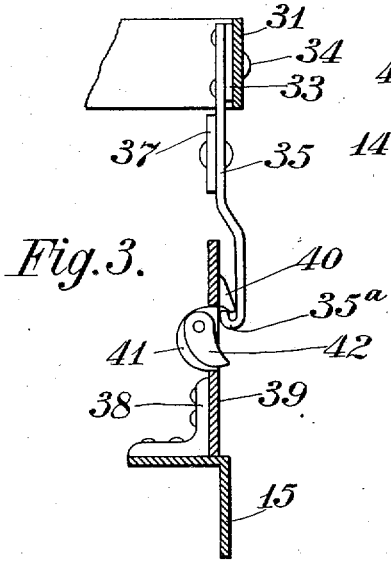
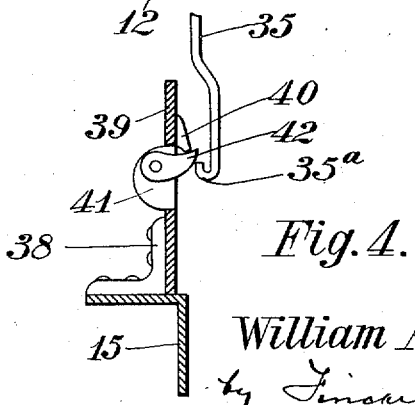
Witnesses
Benjamin Finckel
B. M. Leuthstrom
Inventor
William A. Pease
by Finckel & Finckel
his Attorneys

UNITED STATES PATENT OFFICE.

WILLIAM A. PEASE, OF COLUMBUS, OHIO, ASSIGNOR TO THE E. M. HULSE COMPANY, OF COLUMBUS, OHIO, A CORPORATION OF OHIO.

SOFA OR DAVENPORT BED.

13,612. Specification of Reissued Letters Patent. Reissued Sept. 2, 1913.

Original No. 1,057,665, dated April 1, 1913, Serial No. 745,080. Application for reissue filed June 2, 1913. Serial No. 771,372.

*To all whom it may concern:*

Be it known that I, WILLIAM A. PEASE, a citizen of the United States, residing at Columbus, in the county of Franklin and State of Ohio, have invented a certain new and useful Improvement in Sofa or Davenport Beds, of which the following is a specification.

The object of this invention is to provide improved means for confining and protecting the folded portion of a mattress in folding beds and improved means in conjunction therewith for latching a folding section of the spring frame.

The invention is embodied in the construction herein shown and described, the features of novelty being pointed out in the claims appended hereto.

In the accompanying drawings—Figure 1 is a view in elevation of the end of the bed with the end member or standard removed so as to expose the mechanism. In this view the bed is shown as opened. Fig. 2 is a detail showing the outermost or supplemental section of the folding bed frame folded and latched. Fig. 3 is an enlarged detail in section on the line *x—x* Fig. 2 showing the catch caught in the closed position of the said supplemental section. Fig. 4 is a like view illustrating how the catch is released for opening the said supplemental bed section.

As usual in such structures 11 designates the end members or main supporting standards, of which there are two, between which is suitably secured and supported the base box or stationary frame 10. To the front corner of the base box or frame 10 is hinged at $12^a$ the seat frame 12.

The characters 13, 14 and 15 designate respectively the regular inner, outer and middle sections of the folding bed frame which are operated by suitable devices connected with the seat frame substantially as in the United States patent of Sharp and Pease, No. 1,009,444 and require no description here because they do not constitute an essential part of the present invention.

A feature of the construction shown consists of a lever 21 pivoted at 22 on the end of the base or frame 10, said lever having at the extremity of its upper arm a lateral inwardly extending bearing 23 and said lever having connected with its lower end a strong coiled spring 24 that is connected at its rear end to an eye 25 secured in the rear wall of the base box or frame. When the seat frame is closed the edge of the end of that frame depresses the upper arm of the lever 21 and stretches the spring 24. When fully closed the spring exerts not much lifting force on the seat frame because the fulcrum of the lever and the two points of connection are nearly in a straight line. But as the seat is raised the lifting or actuating force becomes greater until the lever assumes an erect position as shown in Fig. 1 where the lever is caught by a stop 26. The edge of the seat frame can be provided with a metallic strap 27 to lessen wear of the wooden frame by the bearing 23, and the upper edge of the base box is provided with a notch $12^b$ into which the bearing 23 extends when depressed. Because little force is exerted by the spring when the bed is closed no lock is required to hold the seat down.

28 designates the leg. This leg is in the form of a lever pivoted at 29 to the end of the seat frame. This leg lever has hinged to its upper end a link bar 30 that reaches rearward (as viewed in Fig. 1) to a metallic post on the base box to which it is also hinged. When the bed is opened the leg stands and is held in erect position substantially at right angles to the seat frame to support that member on the floor, but when the seat frame is closed the leg is by the action of the link bar thrown or pushed to a position substantially parallel with the end of the seat frame. In this position the leg is hidden from view of the user of the davenport or sofa when the bed is closed.

The construction thus far described is substantially as shown in an application filed by me January 9, 1913, S. No. 740,900. In the present case there is added to the bed frame section 14 a section 31 which is foldingly connected with said section 14 by means of a linking section 32. The folding section 31 has a lever leg 33 pivoted at 34 to the section 31. The short arm of the lever leg 33 has a short piece 35 formed as a catch riveted to it at an angle and said short piece 35 has a hooked end as seen at $35^a$. Connecting the short piece 35 with an ear 36 on the section 32 is a link 37 which operates, when the section 31 is folded toward the section 14 as seen in Fig. 2, to cause the leg 33 to fold alongside the bar of the frame section 31. When the leg is thus operated the catch piece 35 is turned to stand at an angle to said frame section also as seen in Fig. 2.

Secured by angle brackets 38 on the bar of section 15 is a metal plate 39 having a lug 40 that is engaged by the hook 35[a] when the section 31 is closed on the section 14.

Pivoted on an ear 41 stamped out of the plate 39 is a guiding member 42 adapted, when the hook or catch member 35[a] is depressed below it and then drawn upward, to guide the hook or catch 35[a] over the lug 40, as illustrated in Fig. 4, and therefore permit the section 31 to be opened away from section 14. It will be understood, therefore, that with this construction the catch 35[a] can be not only engaged with the lug but also disengaged from the lug by manipulating the section 31. Heretofore, so far as I am aware, it has been necessary, in folding beds of the species shown, to separately manipulate the catches of an outer bed section resembling that designated 31.

The mechanism described can be in all respects and preferably will be the same at each end of the sofa or davenport bed.

What I claim is:—

1. In a folding bed the combination, with folding bed sections, of a pivoted leg having a catch on one bed section, a lug for receiving said catch on another bed section toward which the first mentioned section folds, and a catch-releasing member adapted to be engaged by the catch when moved beyond said lug, said catch-releasing member permitting the catch to pass over said lug when the catch is moved in the opposite direction.

2. In a folding bed the combination with folding bed sections of a pivoted leg having a catch on one bed section, a plate 39 having a lug thereon for receiving said catch on another bed section toward which the first mentioned section folds, and a catch-releasing member adapted to be engaged by the catch when moved beyond said lug, said catch-releasing member permitting the catch to pass over said lug when the catch is moved in the opposite direction.

3. In a folding bed, the combination with two bed sections, foldable one on the other, of a catch connected with one of the bed sections, a lug for receiving said catch on the other bed section when said sections are in folded relation to each other, and a catch-releasing member adapted by movement of the first mentioned section toward the second mentioned section to cause the catch to escape the lug when the first mentioned section is then moved away from the second mentioned section.

WILLIAM A. PEASE.

Witnesses:
J. G. HULSE,
WM. FRITSCHE.

Copies of this patent may be obtained for five cents each, by addressing the "Commissioner of Patents, Washington, D. C."